United States Patent
Wang et al.

(10) Patent No.: US 12,263,541 B2
(45) Date of Patent: Apr. 1, 2025

(54) LASER PROCESSING DEVICE AND LASER PROCESSING METHOD USING SAME

(71) Applicant: Panasonic Intellectual Property Management Co., Ltd., Osaka (JP)

(72) Inventors: Jingbo Wang, Hyogo (JP); Masatoshi Nishio, Osaka (JP); Kenzo Shibata, Hyogo (JP); Manabu Nishihara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 780 days.

(21) Appl. No.: 17/527,495

(22) Filed: Nov. 16, 2021

(65) Prior Publication Data
US 2022/0072662 A1    Mar. 10, 2022

Related U.S. Application Data

(63) Continuation of application No. PCT/JP2020/017622, filed on Apr. 24, 2020.

(30) Foreign Application Priority Data

May 29, 2019 (JP) ................................ 2019-100185

(51) Int. Cl.
*B23K 26/384* (2014.01)
*B23K 26/035* (2014.01)
(Continued)

(52) U.S. Cl.
CPC .......... *B23K 26/384* (2015.10); *B23K 26/035* (2015.10); *B23K 26/062* (2015.10); *B23K 26/064* (2015.10)

(58) Field of Classification Search
CPC .... B23K 26/064; B23K 26/21; B23K 26/062; B23K 26/035; B23K 26/384;
(Continued)

(56) References Cited

U.S. PATENT DOCUMENTS 8,781,269 B2 * 7/2014 Huber .................... G02B 6/262
 385/18
2004/0026381 A1    2/2004 Tsukamoto et al.
(Continued)

FOREIGN PATENT DOCUMENTS

JP    58-159514    9/1983
JP    S58159514 A  *  9/1983
(Continued)

OTHER PUBLICATIONS

International Search Report of PCT application No. PCT/JP2020/017622 dated Jun. 23, 2020.

*Primary Examiner* — Dana Ross
*Assistant Examiner* — Kuangyue Chen
(74) *Attorney, Agent, or Firm* — Wenderoth, Lind & Ponack, L.L.P.

(57) ABSTRACT

A laser processing device includes a laser oscillator, optical fiber (90), beam control mechanism (20), and a laser light emitting head. The laser oscillator includes first and second laser oscillation units that generate first and second laser light rays (LB1) and (LB2), respectively. Beam control mechanism (20) includes optical path changing and holding mechanism (40) that is disposed between second condenser lens (32) that condenses second laser light (LB2) and dichroic mirror (33) that multiplexes first and second laser light rays (LB1) and (LB2) and causes the multiplexed light to be incident on optical fiber (90). Beam control mechanism (20) changes an incident position of second laser light (LB2) on optical fiber (90).

16 Claims, 10 Drawing Sheets

(51) Int. Cl.
*B23K 26/062* (2014.01)
*B23K 26/064* (2014.01)

(58) Field of Classification Search
CPC .. B23K 26/073; B23K 26/38; B23K 26/0613; H01S 3/2391; H01S 3/0071
See application file for complete search history.

(56) References Cited

U.S. PATENT DOCUMENTS

| | | |
|---|---|---|
| 2011/0290769 A1 | 12/2011 | Furuta et al. |
| 2018/0147660 A1 | 5/2018 | Scherbakov et al. |
| 2018/0159299 A1 | 6/2018 | Zhou et al. |
| 2019/0278026 A1 | 9/2019 | Nishio et al. |

FOREIGN PATENT DOCUMENTS

| | | | |
|---|---|---|---|
| JP | 59-042502 | | 3/1984 |
| JP | 61-016938 Y | | 5/1986 |
| JP | S61016938 Y | * | 5/1986 |
| JP | 7-301724 | | 11/1995 |
| JP | 10-314973 | | 12/1998 |
| JP | 2002-224867 | | 8/2002 |
| JP | 2005-313195 | | 11/2005 |
| JP | 2011-253866 | | 12/2011 |
| JP | 2013-055111 | | 3/2013 |
| WO | 2018/110016 | | 6/2018 |

\* cited by examiner

| CASE | 1 | 2 | 3 | 4 | 5 |
|---|---|---|---|---|---|
| POWER RATIO BETWEEN FIRST LASER LIGHT (P1) AND SECOND LASER LIGHT (P2) | $P_1 \neq 0$<br>$P_2 = 0$ | $P_1/P_2 >$<br>$\phi_1^2/(\phi_2^2-\phi_1^2)$ | $P_1/P_2 =$<br>$\phi_1^2/(\phi_2^2-\phi_1^2)$ | $P_1/P_2 <$<br>$\phi_1^2/(\phi_2^2-\phi_1^2)$ | $P_1 = 0$<br>$P_2 \neq 0$ |
| BEAM PROFILE OF LASER LIGHT |  |  |  |  |  |

LASER PROCESSING DEVICE AND LASER PROCESSING METHOD USING SAME

This application is a continuation of the PCT International Application No. PCT/JP2020/017622 filed on Apr. 24, 2020, which claim the benefit of foreign priority of Japanese patent application No. 2019-100185 filed on May 29, 2019, the contents all of which are incorporated herein by reference.

TECHNICAL FIELD

The present invention relates to a laser processing device and a laser processing method using the same.

BACKGROUND ART

In the related art, a technology of generating high-output laser light by beam-combining laser light rays emitted from a plurality of laser diodes or a laser diode bar has been known. Such laser light is transmitted by an optical fiber and is used for laser-processing of a workpiece.

On the other hand, a technology of performing laser-processing by changing beam quality of laser light according to a material or a shape of the workpiece has been proposed in recent years.

For example, PTL 1 discloses a laser system in which laser light is incident on a plurality of bundled optical fibers that can be optically coupled with laser light. The laser system includes a reflector and a condenser lens disposed on an optical path of the laser light, and a piezo actuator that moves the reflector or the condenser lens. The piezo actuator causes the laser light to be incident on an optical fiber selected from among the plurality of optical fibers by changing an incident position of the laser light in the plurality of bundled optical fibers. Each optical fiber is a multi-clad fiber. The piezo actuator changes a beam profile of the laser light by adjusting the incident position of the laser light in the optical fiber.

PTL 2 proposes a configuration in which an incident position of laser light on an incident end face of a multi-clad fiber is changed by moving a position of a condenser lens or inserting a wedge-shaped optical element into an optical path of the laser light.

CITATION LIST

Patent Literature

PTL 1: US 2018/159299 A1
PTL 2: U.S. Pat. No. 8,781,269

SUMMARY OF THE INVENTION

Technical Problem

Incidentally, a light absorptance of metal has generally wavelength dependency. As a wavelength of light illuminated to the metal becomes shorter, the light absorptance of the metal tends to become higher. Laser-processing performed with combined laser light including laser light rays having different wavelengths from each other by using such characteristics has been proposed. However, PTL 1 and PTL 2 do not disclose such a technology.

In the laser system disclosed in PTL 1, since the reflector and the condenser lens which are relatively large optical components are moved by the actuator, there is a problem in responsiveness, and it is difficult to change the incident position on the optical fiber by quickly changing the optical path of the laser light. Thus, when the shape of the workpiece changes, it is difficult to control the power distribution of the laser light according to the change, and it is difficult to maintain processing quality of the workpiece.

PTL 2 discloses a method for changing the incident position of the laser light by moving the position of the condenser lens. This method has a problem in achieving both positional accuracy and responsiveness since the condenser lens needs to be moved on a straight line by an actuator. When the optical element is moved while being inserted into the optical path of the laser light during continuous oscillation, since the laser light is scattered in an unexpected direction by an edge portion of the optical element, there is a concern that a defect occurs in the laser processing. There is a concern that the inside of a laser resonator is damaged by the scattered laser light.

The present invention has been made in view of such a point, and an object of the present invention is to provide a laser processing device capable of combining laser light rays having different wavelengths from each other and controlling a power distribution of multiplexed laser light and a laser processing method using the same.

Solution to Problem

In order to achieve the above object, a laser processing device according to the present invention includes at least a laser oscillator that generates laser light, an optical fiber that includes at least a core, a first cladding provided coaxially with the core on an outer peripheral side of the core, and a second cladding provided coaxially with the core on an outer peripheral side of the first cladding, and includes an incident end face and an emission end opposite to the incident end face, a beam control mechanism that is provided in the laser oscillator, and introduces the laser light into the incident end face of the optical fiber, and a laser light emitting head that is attached to the emission end of the optical fiber, and illuminates the laser light to a workpiece. The laser oscillator includes a first laser oscillation unit that generates first laser light having a first wavelength, and a second laser oscillation unit that generates second laser light having a second wavelength different from the first wavelength, the beam control mechanism includes at least a first condenser lens that receives the first laser light, and condenses the first laser light at a predetermined magnification, a second condenser lens that receives the second laser light, and condenses the second laser light at a predetermined magnification, an optical combining member that receives the first laser light condensed by the first condenser lens and the second laser light condensed by the second condenser lens, forms the laser light by combining the first laser light and the second laser light, an optical axis of the first laser light coinciding with an optical axis of the second laser light, and causes the laser light to be directed to the incident end face of the optical fiber, an optical path changing and holding mechanism that is disposed on at least one of an optical path of the first laser light between the first condenser lens and the optical combining member and an optical path of the second laser light between the second condenser lens and the optical combining member, and changes and holds the at least one of the optical path of the first laser light and the optical path of the second laser light, and a controller that controls an operation of the optical path changing and holding mechanism, and the beam control mechanism controls a power distribution of the laser light emitted from the laser light emitting head by changing an incident position of at least one of the first laser light and the second laser light on the incident end face of the optical fiber.

As described above, the optical path of the second laser light can be easily changed by providing the optical path changing and holding mechanism on the optical path of the second laser light between the second condenser lens and the optical combining member. Accordingly, it is possible to control the power distribution of the laser light formed from the first laser light and the second laser light.

A laser processing method according to the present invention is a laser processing method using the laser processing device. The method includes at least a first illumination step of illuminating the laser light having a first power distribution to the workpiece, and a second illumination step of subsequently illuminating the laser light having a second power distribution different from the first power distribution to the workpiece.

According to this method, it is possible to reliably form a molten pool and a keyhole in a workpiece at an initial stage of the start of welding, and welding quality of the workpiece is improved.

Advantageous Effect of Invention

According to the laser processing device according to the present invention, the power distribution of the laser light formed from the first laser light and the second laser light can be controlled. According to the laser processing method according to the present invention, the welding quality of the workpiece is improved.

DESCRIPTION OF EMBODIMENTS

Hereinafter, exemplary embodiments of the present invention will be described in detail with reference to the drawings. Descriptions of preferred exemplary embodiments to be described below are intrinsically examples, and are not intended to limit the present invention, and applications or uses of the present invention.

First Exemplary Embodiment

[Configuration of Laser Processing Device]

Figure 1:
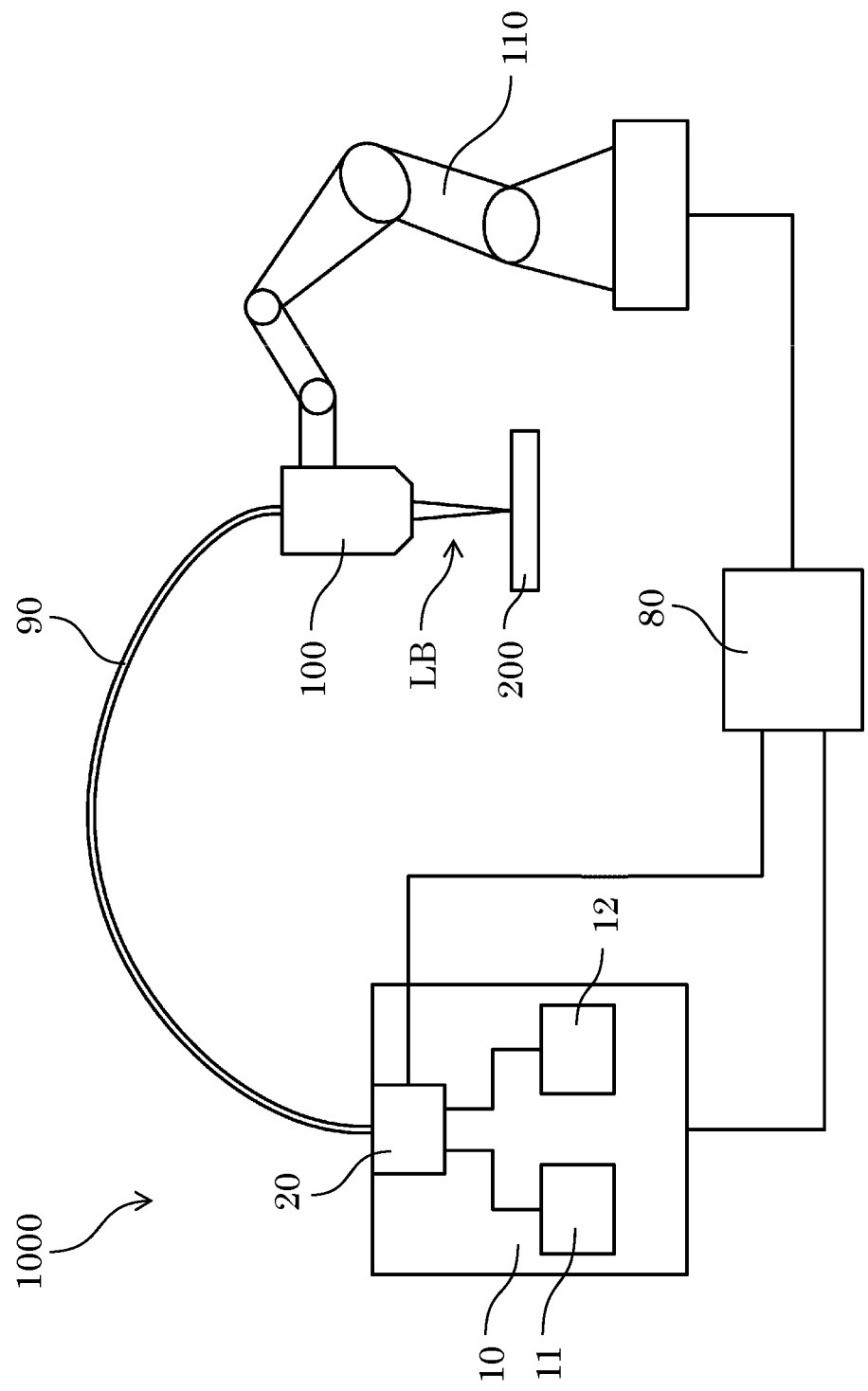
FIG. 1 is a schematic diagram illustrating a configuration of a laser processing device according to a first exemplary embodiment of the present invention.
Figure 2:
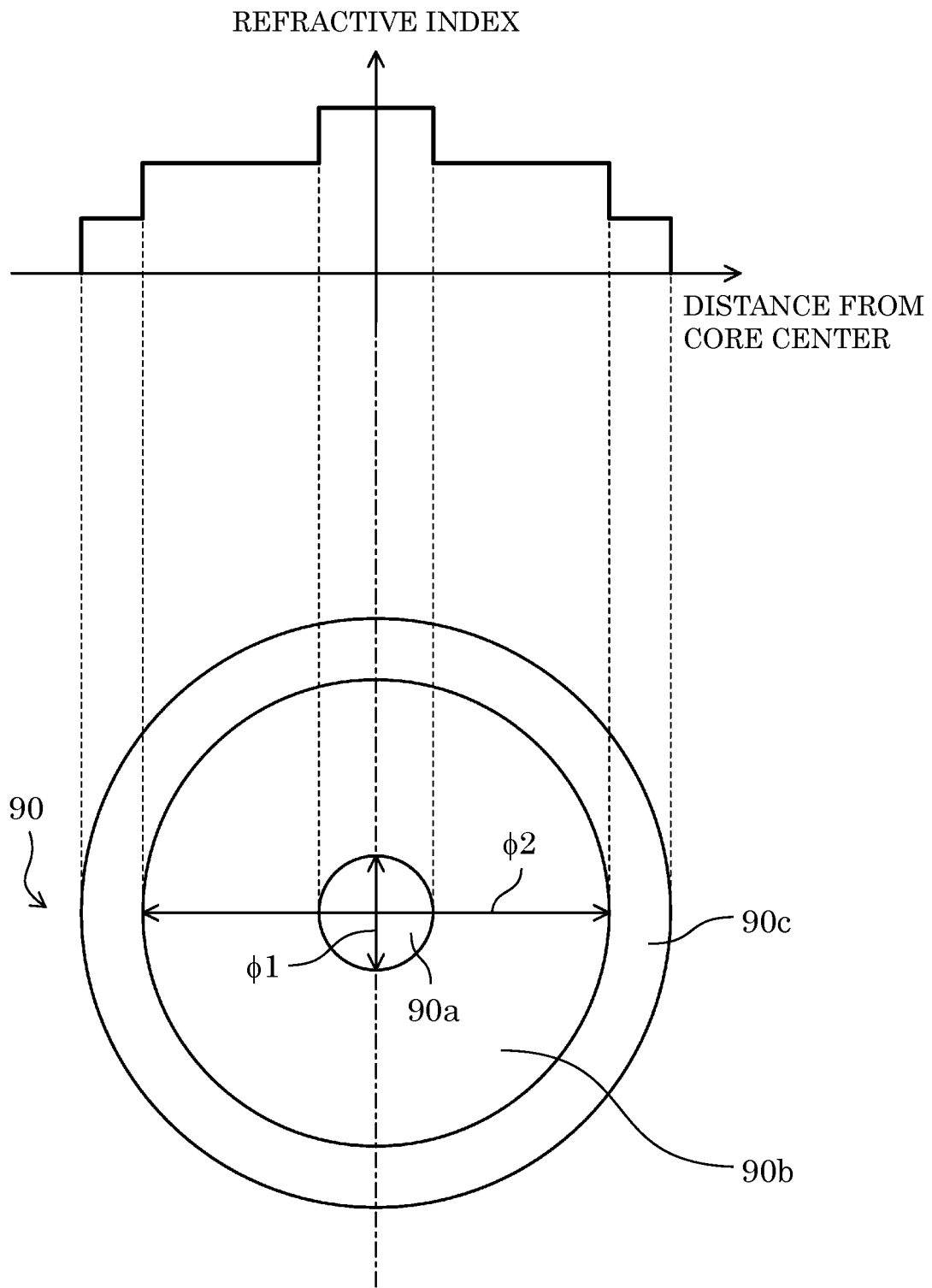
FIG. 2 is a schematic diagram illustrating a refractive index distribution of an optical fiber.

FIG. 1 is a schematic diagram of a configuration of a laser processing device according to the present exemplary embodiment, and laser processing device 1000 includes laser oscillator 10, beam control mechanism 20, controller 80, optical fiber 90, laser light emitting head 100, and manipulator 110. FIG. 2 illustrates a refractive index distribution of optical fiber 90.

Laser oscillator 10 is a laser light source that receives power supply from a power supply (not illustrated) and generates laser light LB. Laser oscillator 10 includes first laser oscillation unit 11 that generates first laser light LB1 having a wavelength of $\lambda 1$ (hereinafter, also referred to as first wavelength $\lambda 1$) and second laser oscillation unit 12 that generates second laser light LB2 having a wavelength of $\lambda 2$ (hereinafter, also referred to as second wavelength $\lambda 2$). First wavelength $\lambda 1$ and second wavelength $\lambda 2$ have different values, and in the present exemplary embodiment, first wavelength $\lambda 1$ is longer than second wavelength $\lambda 2$.

For example, first laser oscillation unit 11 can be a fiber laser or a disk laser, or an yttrium aluminum garnet (YAG) laser, and second laser oscillation unit 12 can be a semiconductor laser. In this case, first wavelength $\lambda 1$ is set in a range from 1000 nm to 1100 nm, and second wavelength $\lambda 2$ is set in a range from 800 nm to 1000 nm. Second laser oscillation unit 12 may be a visible-light laser, and second wavelength $\lambda 2$ may be set in a range from 400 nm to 800 nm.

First laser oscillation unit 11 and second laser oscillation unit 12 may have different configurations depending on a material of workpiece 200. For example, first laser oscillation unit 11 may be a semiconductor laser, and second laser oscillation unit 12 may be a visible-light laser. In this case, first wavelength $\lambda 1$ is set in a range from 800 nm to 1000 nm, and second wavelength $\lambda 2$ is set in a range from 400 nm to 800 nm.

Each of first laser oscillation unit 11 and second laser oscillation unit 12 may include a single laser light source or may include a plurality of laser modules. As will be described later, first laser light LB1 and second laser light LB2 are combined by beam control mechanism 20, and the combined laser light is incident, as laser light LB, on optical fiber 90.

Beam control mechanism 20 is provided in laser oscillator 10, and combines first laser light LB1 and second laser light LB2, introduces combined laser light LB into an incident end face of optical fiber 90, and controls a power distribution of laser light LB emitted from an emission end of optical fiber 90. A configuration and an operation of beam control mechanism 20 will be described later.

Optical fiber 90 is a so-called multi-clad fiber. Optical fiber 90 includes core 90a, first cladding 90b provided coaxially with core 90a on an outer peripheral side of core 90a, and second cladding 90c provided coaxially with core 90a on an outer peripheral side of first cladding 90b. Core 90a, first cladding 90b, and second cladding 90c are mainly made of quartz, and as illustrated in FIG. 2, a refractive index of core 90a is the highest, and refractive indexes of first cladding 90b and second cladding 90c decrease in this order. The refractive indexes of first cladding 90b and second cladding 90c may be adjusted by doping substances of different types or concentrations with which both the refractive indexes can be decreased. The refractive index of core 90a may also be adjusted by doping substances of different types or concentrations with which the refractive indexes can be increased. In optical fiber 90 having such a refractive index distribution, laser light LB incident on core 90a at a predetermined angle can propagate in core 90a without entering first cladding 90b, but laser light LB incident on first cladding 90b at a predetermined angle can propagate in first cladding 90b without entering second cladding 90c. As a structure of the optical fiber for achieving such a propagation method of laser light LB, the structure illustrated in FIG. 2 is merely an example, and core 90a, first cladding 90b, and second cladding 90c do not necessarily have different refractive indexes. For example, core 90a, first cladding 90b, and second cladding 90c may have same refractive index N1, and a thin layer having refractive index N2 (N2<N1) may be provided between core 90a and first cladding 90b and between first cladding 90b and second cladding 90c. Thus, laser light LB incident on core 90a at the predetermined angle can propagate in core 90a without entering first cladding 90b, but laser light LB incident on first cladding 90b at the predetermined angle can propagate in first cladding 90b without entering second cladding 90c. The layer having refractive index N2 is mainly made of quartz, but may be doped with a substance with which the refractive index can be decreased. Laser light LB incident on optical fiber 90 propagates through core 90a and/or first cladding 90b, and reaches the emission end of optical fiber 90. As illustrated in FIG. 2, a diameter of core 90a is φ1, and a diameter of first cladding 90b is φ2. Although not illustrated, a film or a resin-based protective layer that mechanically protects optical fiber 90 is provided on an outer peripheral surface of second cladding 90c.

Laser light emitting head 100 is attached to the emission end of optical fiber 90, and laser-machines workpiece 200 by illuminating laser light LB transmitted through optical fiber 90 to workpiece 200. Optical components (not illustrated), for example, a collimator lens, a condenser lens, a protective glass, and the like are disposed inside laser light emitting head 100.

Controller 80 controls laser oscillation of laser oscillator 10. Specifically, by supplying control signals such as an output current and an on-time to a power supply (not illustrated) connected to laser oscillator 10, laser oscillation control in first laser oscillation unit 11 and second laser oscillation unit 12, for example, output power control of first laser light LB1 and second laser light LB2 and on- or off-control of the first and second laser light rays are performed.

Controller 80 performs drive control of motor 70 (see FIGS. 4A and 4B) provided in beam control mechanism 20 according to contents of a selected laser processing program. Controller 80 controls an operation of manipulator 110. The laser processing program is stored in a storage (not illustrated). The storage may be provided inside controller 80 or may be provided outside controller 80 and may be configured to exchange data with controller 80. Controller 80 constitutes a part of beam control mechanism 20.

Manipulator 110 is connected to controller 80, and moves laser light emitting head 100 so as to draw a predetermined trajectory according to the above-described laser processing program. A controller that controls the operation of manipulator 110 may be provided separately.

[Configuration of Beam Control Mechanism]

Figure 3:
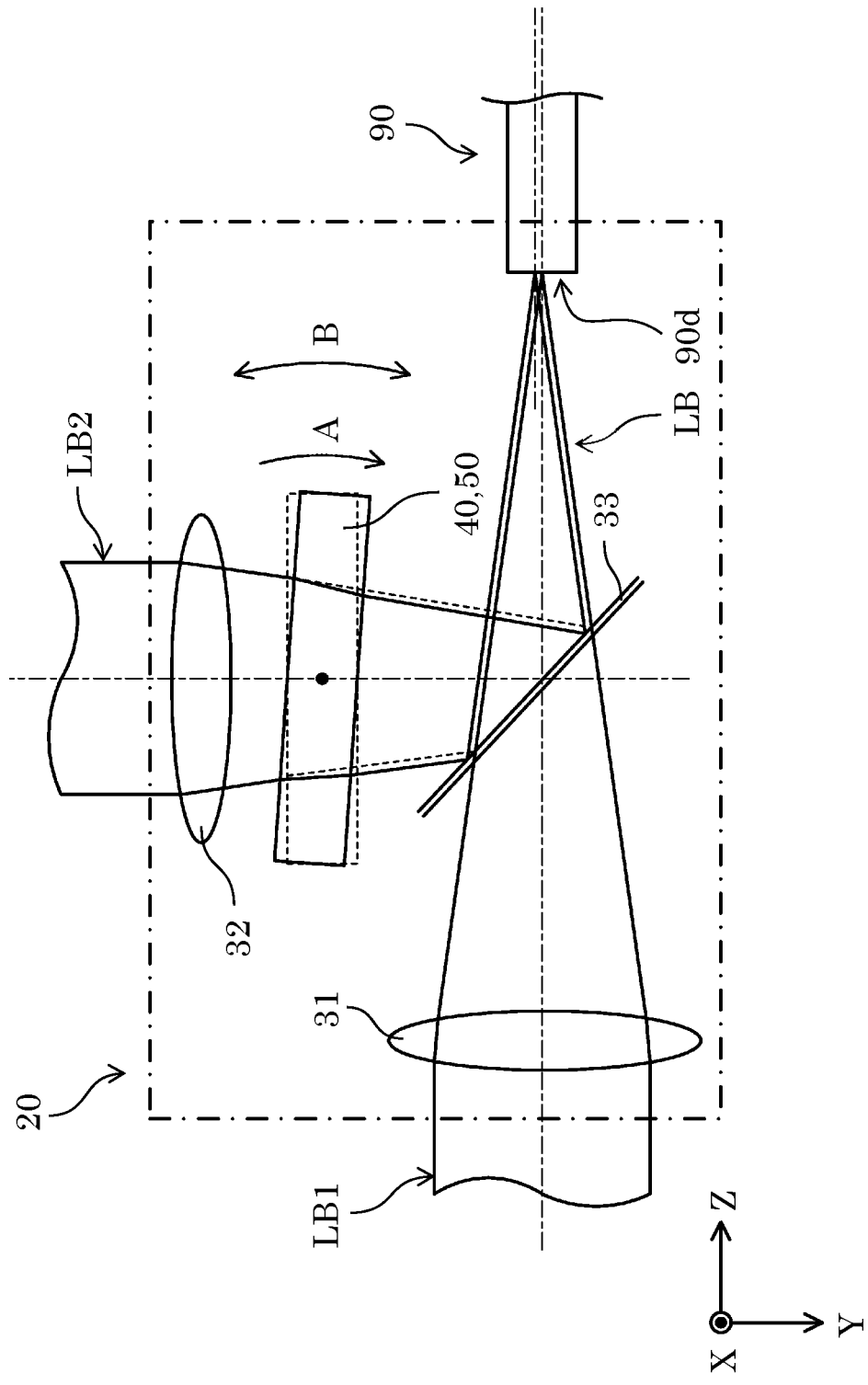
FIG. 3 is a schematic diagram of a beam control mechanism as viewed from an X direction.
Figure 4A:
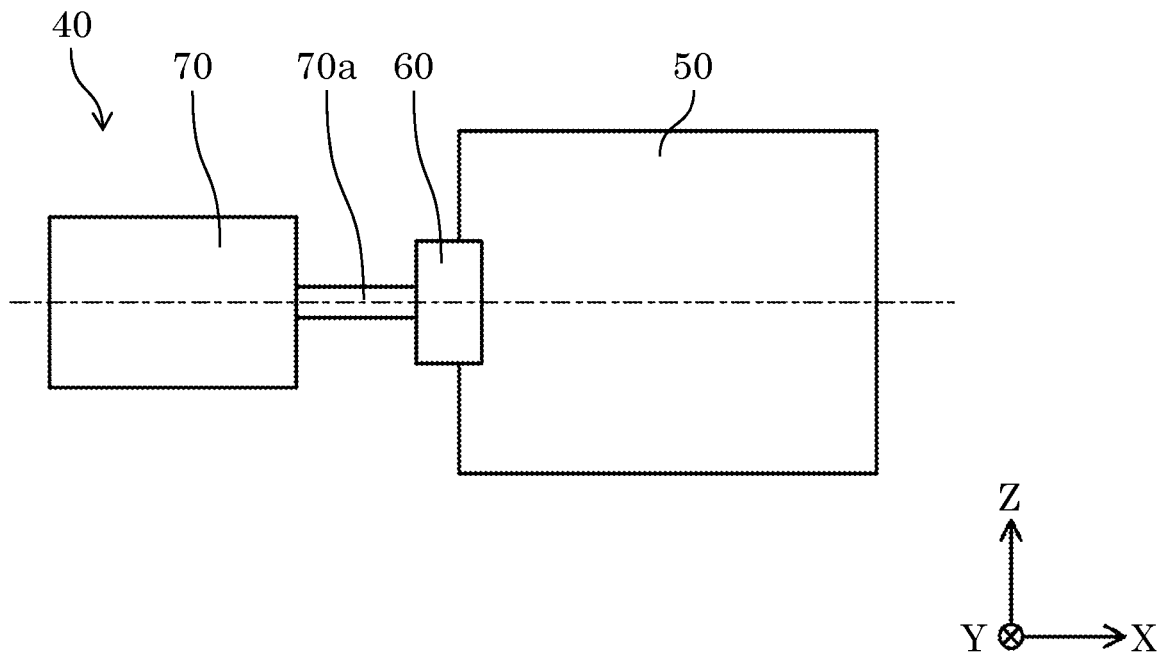
FIG. 4A is a schematic diagram of main parts of the beam control mechanism as viewed from a Y direction.
Figure 4B:
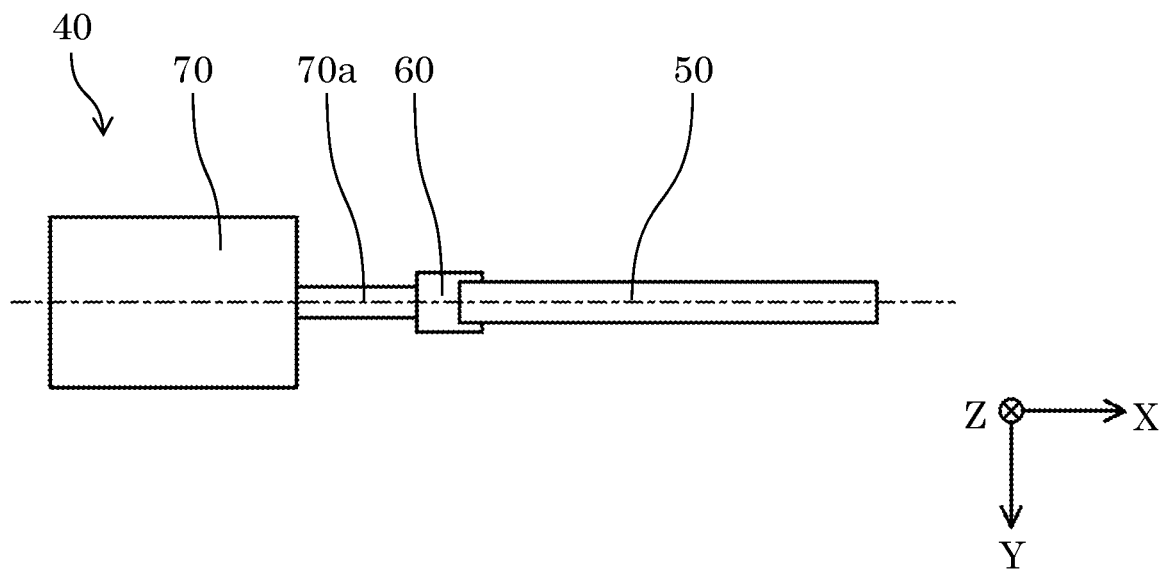
FIG. 4B is a schematic diagram of the main parts of the beam control mechanism as viewed from a Z direction.

FIG. 3 is a schematic diagram of the beam control mechanism as viewed from an X direction, FIG. 4A is a schematic diagram of main parts of the beam control mechanism as viewed from a Y direction, and FIG. 4B is a schematic diagram of the main parts of the beam control mechanism as viewed from a Z direction. In the present specification, a traveling direction of laser light LB from dichroic mirror 33 to optical fiber 90 may be referred to as the Z direction, a direction in which output shaft 70a of motor 70 extends may be referred to as the X direction, and a direction orthogonal to the X direction and the Z direction may be referred to as the Y direction.

An axis of output shaft 70a of motor 70 may be referred to as an X axis (first axis). As illustrated in FIG. 3, the X axis is substantially orthogonal to optical axes of laser light LB, first laser light LB1, and second laser light LB2.

In the present specification, the expression "substantially orthogonal" means being orthogonal, taking into account assembly tolerances of components, and does not mean being strictly orthogonal. Similarly, the expression "substantially equal" means being equal, taking into account manufacturing tolerances and assembly tolerances of components, and does not mean that both targets to be compared are strictly equal. The expression "substantially equal" also means being equal with a predetermined degree of accuracy in comparison with an estimated value, but does not mean that a target to be compared and the estimated value are strictly equal.

As illustrated in FIGS. 3, 4A, and 4B, beam control mechanism 20 includes first condenser lens 31, second condenser lens 32, optical member 50, dichroic mirror (optical combining member) 33, motor 70, and controller 80. As will be described later, motor 70 and optical member 50 function as optical path changing and holding mechanism 40 that changes and holds an optical path of second laser light LB2 after being condensed by second condenser lens 32.

First and second laser light rays LB1 and LB2 are laser light rays generated from first laser oscillation unit 11 and second laser oscillation unit 12, respectively, and are incident on first and second condenser lenses 31 and 32, respectively, in a state of collimated light rays by an optical component (not illustrated), for example, a collimating lens or the like. First and second condenser lenses 31 and 32, respectively, condense first and second laser light rays LB1 and LB2 at a predetermined magnification with respect to a collimating lens (not illustrated).

Dichroic mirror 33 is disposed at a position where an optical path of first laser light LB1 condensed by first condenser lens 31 and an optical path of second laser light LB2 condensed by second condenser lens 32 intersect with each other. The optical axis of first laser light LB1 and the optical axis of second laser light LB2 before being incident on dichroic mirror 33 are orthogonal to each other, and a surface of dichroic mirror 33 is disposed so as to form an angle of 45 degrees with the optical axis of second laser light LB2 as viewed from the X direction.

Dichroic mirror 33 transmits first laser light LB1 as it is, and reflects second laser light LB2 on the surface at a ratio of 99.0% or more which is close to 100%. When output shaft 70a of motor 70 is at an initial position, optical member 50 is disposed so as to be substantially orthogonal to the optical axis of second laser light LB2. In this state, the optical axis of second laser light LB2 overlaps the optical axis of first laser light LB1, and first laser light LB1 and second laser light LB2 are combined. Combined laser light LB is incident on optical fiber 90.

Optical member 50 is a parallel plate-shaped member made of a material transparent to first laser light LB1 and second laser light LB2. Optical member 50 is made of, for example, quartz and has a refractive index larger than 1 with respect to first wavelength λ1 and second wavelength λ2 of laser light LB. As optical member 50, a member in which antireflection coating is performed on both surfaces may be used in order to reduce a reflectance to the incident laser light, in this case, second laser light LB2 as much as possible. It is preferable that a reflectance of optical member 50 when the antireflection coating is performed is much less than 1%. Optical member 50 is disposed on the optical path of second laser light LB2 between second condenser lens 32 and dichroic mirror 33.

Motor 70 has output shaft 70a, and is coupled to optical member 50 via holder 60. Motor 70 is driven to rotate output shaft 70a about the X axis, and thus, optical member 50 rotates in a YZ plane about a coupling portion with holder 60. Motor 70 is configured not to rotate only in one direction (direction A illustrated in FIG. 3) but to be rotatable in both forward and reverse directions (direction B illustrated in FIG. 3). A rotation frequency is variable, and can be changed in a range of about several Hz to several kHz when welding is performed. As will be described later, when beam control mechanism 20 is operated, motor 70 does not continuously rotate in one direction but rotates in a predetermined angle range. In other words, optical member 50 tilts at a predetermined angle about the coupling portion with holder 60. Motor 70 can quickly rotate optical member 50 in a reciprocating manner within a set angle range. Motor 70 is connected to controller 80 and is driven by a control signal from controller 80.

A thickness of optical member 50 in the Z direction is about 1 mm to several mm, but is not particularly limited thereto. The thickness can be changed to another value as appropriate in a relationship between a moving distance of second laser light LB2 on incident end face 90d of optical fiber 90 and a rotation angle of motor 70. When the thickness is about several mm, since the optical member is installed at a narrow position through which condensed second laser light LB2 passes between second condenser lens 32 and dichroic mirror 33, a required size of the optical member is small, and motor 70 can easily rotate the optical member in the reciprocating manner at a high speed, for example, at a rotation frequency of several kHz.

[Procedure for Changing Power Distribution of Laser Light]

Next, a procedure for changing the power distribution of laser light LB will be described.

Figure 5:
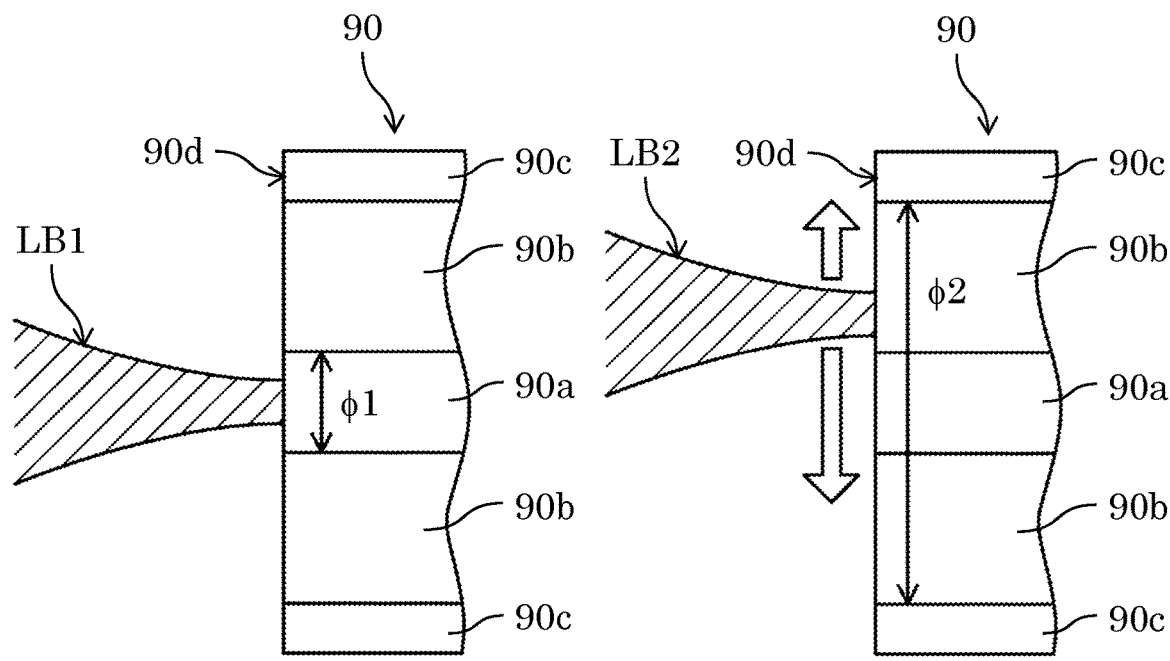
FIG. 5 is a schematic diagram illustrating a state near an incident end of an optical fiber when an incident position of first laser light and an incident position of second laser light are changed.
Figure 6:
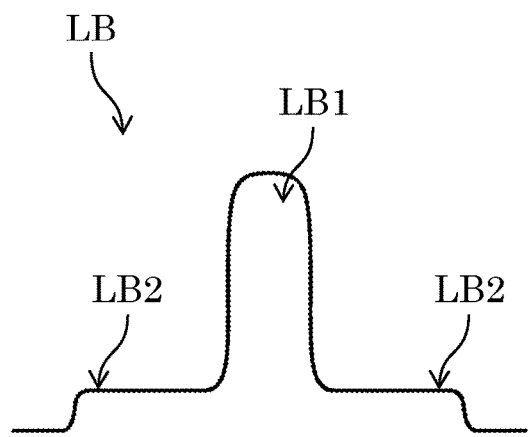
FIG. 6 is a diagram illustrating a beam profile of laser light in the state illustrated in FIG. 5.

FIG. 5 illustrates a state near an incident end of the optical fiber when an incident position of the second laser light is different from an incident position of the first laser light. FIG. 6 illustrates an example of a beam profile of the laser light emitted from laser light emitting head 100 in the state illustrated in FIG. 5. The beam profile illustrated in FIG. 6 corresponds to a power distribution of laser light LB that is emitted from laser light emitting head 100 and forms an image at a focal position. The beam profile illustrated in FIG. 6 corresponds to a power distribution of laser light LB emitted from the emission end of optical fiber 90.

When motor 70 is rotated at a predetermined angle in direction A illustrated in FIG. 3 by a control signal from controller 80, optical member 50 tilts at a predetermined angle in the YZ plane about the coupling portion with holder 60 according to the rotation of motor 70. According to this angle, an angle between a light incident surface of optical member 50 and the optical axis of second laser light LB2 changes, and the optical path of second laser light LB2 is changed inside optical member 50. When second laser light LB2 of which the optical path is changed is reflected by dichroic mirror 33, the optical axis of second laser light LB2 and the optical axis of first laser light LB1 after passing through dichroic mirror 33 are close to each other, but are shifted by a predetermined distance. Thus, first laser light LB1 and second laser light LB2 are combined. As a result, for example, as illustrated in FIG. 5, first laser light LB1 is incident on core 90a of optical fiber 90, while second laser light LB2 is incident on first cladding 90b of optical fiber 90. As illustrated in FIG. 6, the beam profile of laser light LB in this case includes a unimodal portion and terrace portions having a wide half-width formed on both sides of the unimodal portion. The former corresponds to first laser light LB1 transmitted into core 90a, and the latter corresponds to second laser light LB2 transmitted into first cladding 90b. Needless to say, as indicated by an arrow in FIG. 5, motor 70 may be driven to tilt optical member 50 such that all or a part of second laser light LB2 enters core 90a.

As described above, motor 70 is driven to tilt optical member 50, and thus, the incident position of second laser light LB2 on incident end face 90d of optical fiber 90 can be continuously changed. The incident position of second laser light LB2 is changed, and thus, for example, a power ratio between first laser light LB1 transmitted to core 90a and second laser light LB2 transmitted to first cladding 90b can be changed.

Figure 7:
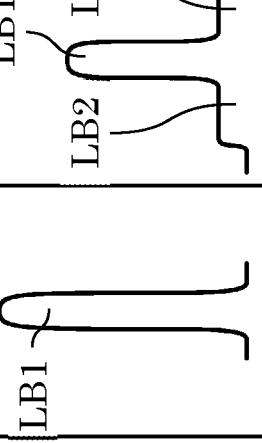
FIG. 7 is a diagram illustrating a beam profile of laser light when a power ratio between the first laser light and the second laser light is changed in the state illustrated in FIG. 5.
Figure 7:
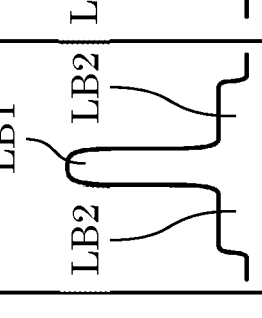
Figure 7:
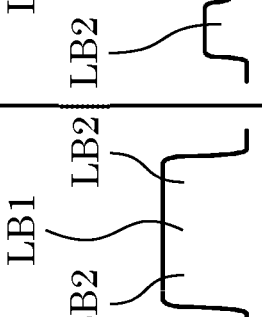
Figure 7:
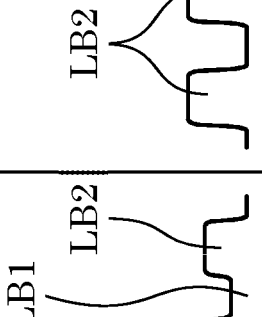
Figure 7:

FIG. 7 illustrates a beam profile of the laser light emitted from laser light emitting head 100 when the power ratio between the first laser light and the second laser light is changed in the state illustrated in FIG. 5. A power of first laser light LB1 and a power of second laser light LB2 are changed by controlling first laser oscillation unit 11 and second laser oscillation unit 12 by control signals from controller 80.

Assuming that the power of first laser light LB1 is P1 and the power of second laser light LB2 is P2, when P1 is a finite value and P2 is zero, the beam profile of laser light LB has a unimodal shape with a narrow half-width (case 1 of FIG. 7).

On the other hand, when the ratio between P1 and P2 has a relationship represented by the following Expression (1), the beam profile changes so as to include a unimodal portion and terrace portions having a wide half-width formed on both sides of the unimodal portion (case 2 of FIG. 7). The former corresponds to first laser light LB1 transmitted into core 90a, and the latter corresponds to second laser light LB2 transmitted into first cladding 90b.

$$P1/P2 > \varphi1^2/(\varphi2^2 \cdot \varphi1^2) \qquad (1)$$

When the ratio between P1 and P2 has a relationship represented by the following Expression (2), a peak value of the unimodal portion and peak values of the terrace portions of the beam profile of laser light LB coincide. The beam profile of laser light LB has a unimodal shape, but a peak value is low and the half-width is large as compared with a case where first laser light LB1 is transmitted into only core 90a (case 3 of FIG. 7).

$$P1/P2 = \varphi1^2/(\varphi2^2 \cdot \varphi1^2) \qquad (2)$$

When the ratio between P1 and P2 has a relationship represented by the following Expression (3), a peak value of a portion of the beam profile of laser light LB corresponding to a component transmitted into core 90a decreases, a peak value of a portion corresponding to a component transmitted into first cladding 90b increases, and the beam profile has a bimodal shape (case 4 of FIG. 7).

$$P1/P2 < \varphi1^2/(\varphi2^2 \cdot \varphi1^2) \qquad (3)$$

When P1 is zero and P2 is a finite value, the beam profile of laser light LB has a bimodal shape, and a power at a central portion is zero (case 5 of FIG. 7).

In the above description, the beam profile illustrated in FIG. 7 is obtained by controlling the powers of first laser light LB1 and second laser light LB2. However, even though the powers of both the laser light rays are fixed, a part of the beam profile illustrated in FIG. 7 can be obtained by changing an illumination position of second laser light LB2. For example, case 2 in which the powers of first laser light LB1 and second laser light LB2 satisfy Expression (1) will be described. As already described with reference to FIG. 7, the beam profile of the case 2 is obtained when entire second laser light LB2 is incident on first cladding 90b. Although not illustrated in FIG. 5, when entire second laser light LB2 is incident on core 90a, the beam profile having the same shape as case 1 of FIG. 7 can be obtained. However, this beam profile includes both first laser light LB1 and second laser light LB2. When the illumination position of second laser light LB2 extends across a boundary between core 90a and first cladding 90b, since a power of a part of second laser light LB2 also enters core 90a, a height of a beam profile of a portion corresponding to first laser light LB1 can be controlled in case 2 of FIG. 7. However, this portion includes both first laser light LB1 and second laser light LB2. Although the description of cases 3 and 4 in which the powers of first laser light LB1 and second laser light LB2 satisfy Expression (2) or (3) is omitted, the beam profiles of cases 1 to 4 illustrated in FIG. 7 can be obtained by controlling the illumination position of second laser beam LB2.

As described above, the beam profile, that is, the power distribution of laser light LB emitted from laser light emitting head 100 can be changed by setting the incident positions of first laser light LB1 and second laser light LB2 to be different from each other or changing the powers of first laser light LB1 and second laser light LB2 on incident end face 90d of optical fiber 90.

The beam profile of laser light LB emitted from laser light emitting head 100 is changed, and thus, it is possible to improve a machined shape of workpiece 200, for example, a welded shape. A further description will be given below.

Figure 8:
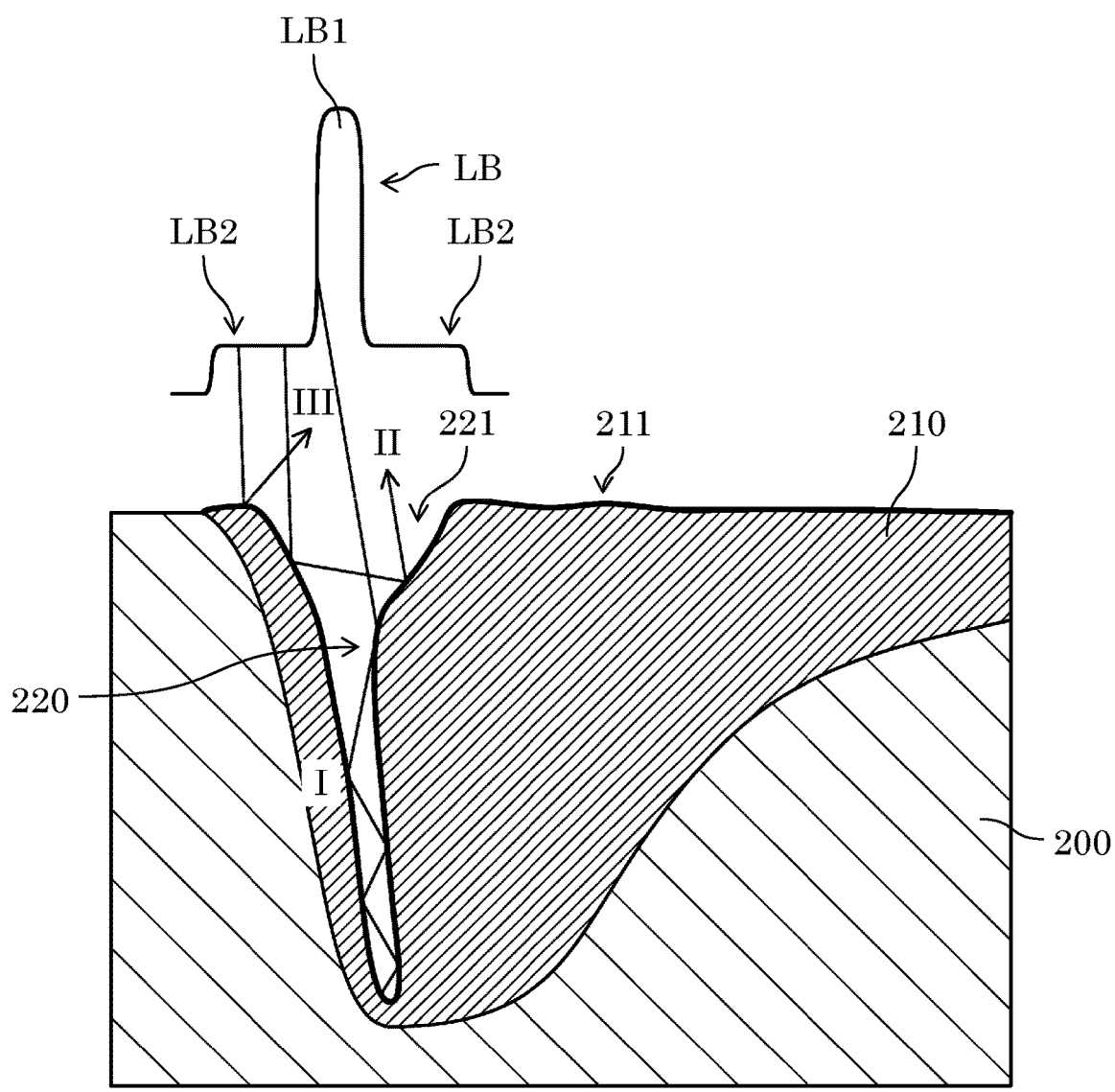
FIG. 8 is a schematic cross-sectional view of a welded portion of a workpiece.

FIG. 8 is a schematic cross-sectional view of a welded portion of the workpiece, and in general, when workpiece 200 made of metal is laser-welded, a portion illuminated by laser light LB is heated to cause weld-penetration, and molten pool 210 is formed. In the portion illuminated by laser light LB, a material constituting molten pool 210 evaporates, and keyholes 220 are formed inside molten pool 210 by a reaction force.

For example, when laser light LB having the beam profile illustrated in FIG. 6 is illuminated to workpiece 200 from laser light emitting head 100, laser light LB is absorbed or reflected around keyhole 220 as will be described below by a ratio between first laser light LB1 and second laser light LB2 included in each portion of the beam profile.

First, a main component of laser light LB passing through path I illustrated in FIG. 8 is first laser light LB1, and second laser light LB2 may be slightly mixed. Laser light LB passing through path I enters the inside of keyhole 220 while being reflected a plurality of times by an inner wall surface of keyhole 220, and is absorbed by molten pool 210.

On the other hand, a main component of laser light LB passing through path II is second laser light LB2, and first laser light LB1 may be slightly mixed. A part of laser light LB passing through path II is reflected by the inner wall surface of keyhole 220 and is radiated to the outside of molten pool 210. Since this radiation does not contribute to the formation of molten pool 210 and keyhole 220, the radiation of the laser light is lost.

Most of laser light LB passing through path III is second laser light LB2. A part of the laser light passing through path III is reflected by a surface of molten pool 210 and is radiated to the outside of workpiece 200. Since this radiation does not contribute to the formation of molten pool 210 and keyhole 220, the radiation of the laser light is lost.

As described above, a part of laser light LB passing through paths II and III may be a loss that does not contribute to laser welding. On the other hand, as described above, a light absorptance of metal increases as a wavelength decreases. Accordingly, since an absorptance of second laser light LB2 in a base metal of workpiece 200 or molten pool 210 is increased by setting second wavelength λ2 of laser light LB passing through paths II and III, in other words, second laser light LB2 incident on first cladding 90b to a value shorter than first wavelength λ1 of first laser light LB1, the entire loss of laser light LB can be reduced.

For example, when workpiece 200 is laser-welded with laser light LB having the beam profile as illustrated in case 1 of FIG. 7, a weld-penetration amount of workpiece 200 increases and keyhole 220 becomes deep, but opening 221 of keyhole 220 does not expand so much, and a constricted portion (not illustrated) may be generated inside keyhole 220. The constricted portion is closed, and thus, air bubbles (not illustrated) remain in molten pool 210. When keyhole 220 closed once is illuminated by laser light LB and becomes keyhole 220 is formed again, the molten metal is rapidly ejected toward the surface. Thus, the spatter is formed and adheres to the surface of workpiece 200 or the surface of molten pool 210 is wavy. When such a wave is generated, unevenness 211 (also referred to as rear vibration part 211) is caused on the surface of workpiece 200 at the rear of molten pool 210 along the traveling direction of the laser welding. When molten pool 210 is rapidly cooled and solidified, this wave remains as unevenness 211 on a surface of a weld bead.

This wave is reflected at an end between molten pool 210 and the solidified portion and bounces back. When the reflected wave reaches keyhole 220, the reflected wave flows so as to fill keyhole 220. Since the flowed molten metal is rapidly heated by the laser light, and metal vapor is rapidly generated, cylindrical shape of keyhole 220 is disturbed. The shape disturbance of keyhole 220, the generation of the air bubble or the spatter, and unevenness 211 caused on the surface of molten pool 210 described above are factors that deteriorate welding quality.

On the other hand, according to the present exemplary embodiment, the power distribution of laser light LB illuminated from laser light emitting head 100 toward workpiece 200, specifically, the power ratio between first laser light LB1 emitted from core 90a and second laser light LB2 emitted from first cladding 90b can be changed using beam control mechanism 20. For example, laser light LB having the beam profile illustrated in FIG. 6 can be illuminated to workpiece 200 by adjusting a tilt angle of optical member 50.

In such a case, although weld-penetration depth D is slightly shallowed, a desired weld-penetration depth is obtained by first laser light LB1 emitted from core 90a. On the other hand, opening 221 of keyhole 220 can be expanded by second laser light LB2 emitted from first cladding 90b. Second laser light LB2 heats workpiece 200 near keyhole 220 to form larger molten pool 210 around keyhole 220. Thus, the amount of molten metal near keyhole 220 increases, and the vibration of molten pool 210 near opening 221 of keyhole 220 generated along with the metal vapor ejected from keyhole 220 can be reduced. Since second wavelength λ2 of second laser light LB2 is shorter than first wavelength λ1 of first laser light LB1, more second laser light LB2 is absorbed by the inner wall surface of keyhole 220 near opening 221 and the surface of molten pool 210. Accordingly, it is possible to prevent the inner wall surfaces of keyholes 220 near opening 221 from being stuck to each other to form the constricted portion, and eventually, it is possible to prevent the air bubbles from being generated inside molten pool 210. The molten metal from the inside of keyhole 220 toward the surface is prevented from being rapidly ejected somewhat, and thus, it is possible to reduce unevenness 211 formed on the surface of molten pool 210 at the rear of molten pool 210. The vibration of molten pool 210 near opening 221 of keyhole 220 can be reduced, and thus, the shape of keyhole 220 can be prevented from being disturbed. As described above, the welding quality in the laser welding can be improved.

The welding quality can be improved by switching between the power distributions of laser light LB emitted from laser light emitting head 100 during the laser welding.

Figure 9:
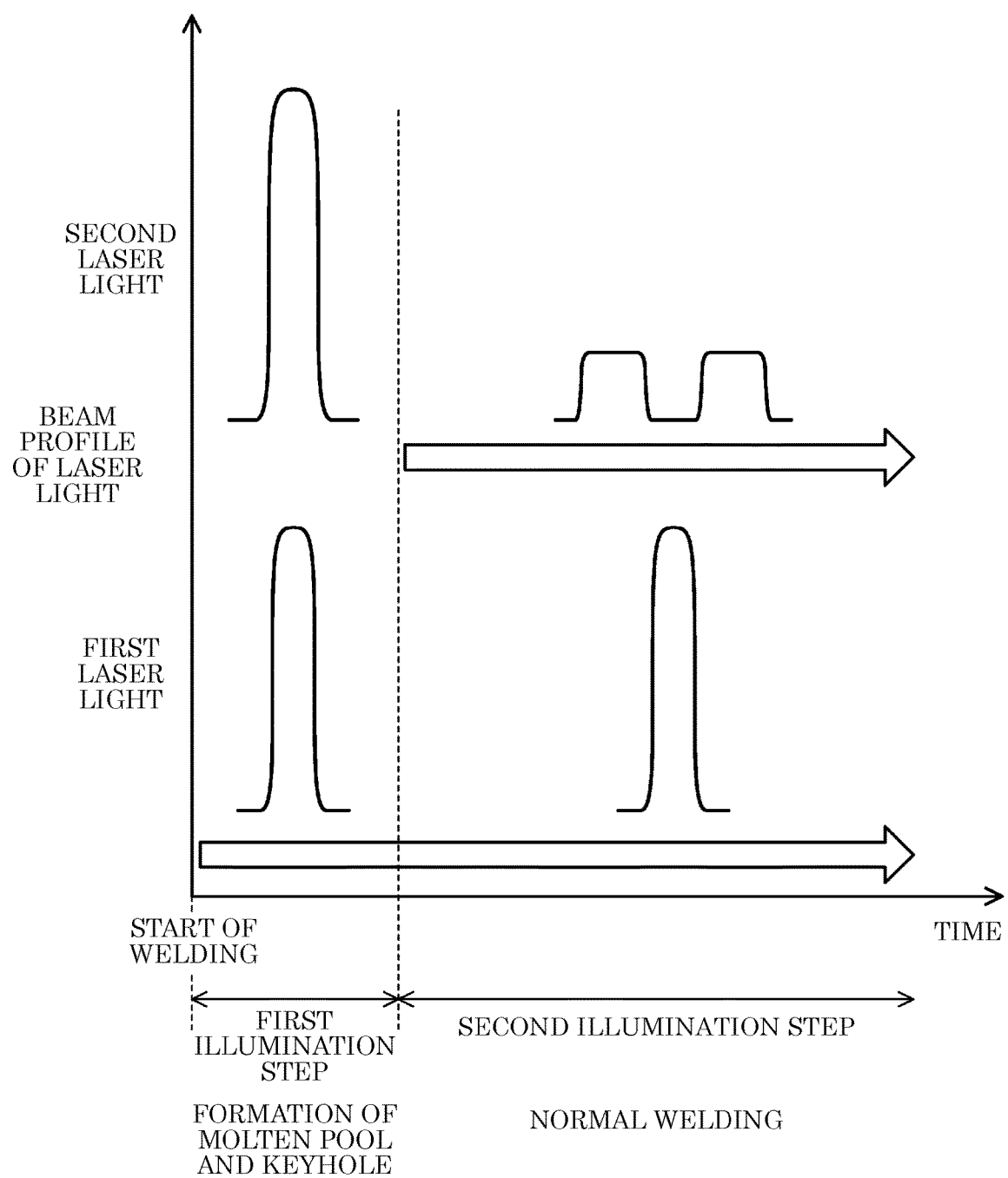
FIG. 9 is a welding sequence of the workpiece.

FIG. 9 illustrates a welding sequence of the workpiece, and molten pool 210 is not formed in workpiece 200 immediately after the start of welding. It is desired that the desired weld-penetration depth is obtained immediately after the start of welding. Thus, controller 80 drives motor 70 to cause both first laser light LB1 and second laser light LB2 to be incident on core 90a. Accordingly, the spot diameter of laser light LB illuminated to workpiece 200 is reduced, the power density of laser light LB at the welded portion is increased, and a laser absorptance of workpiece 200 is increased by second laser light LB2 having a short wavelength (first illumination step). On the other hand, after molten pool 210 and keyhole 220 are formed, it is desired that the constricted portion and the like as described above are prevented from being formed. Thus, controller 80 drives motor 70 to cause second laser light LB2 to be incident on first cladding 90b. Accordingly, opening 221 of keyholes 220 is expanded, and the desired weld-penetration depth is obtained (second illumination step). At this time, the power of first laser light LB1 or the power of second laser light LB2 may be changed as necessary.

In this manner, in the laser welding, molten pool 210 and keyhole 220 can reliably be formed in workpiece 200, and the welding quality can be improved by preventing the air bubble inside workpiece 200, unevenness 211 on the surface, and the like from being generated.

The present invention is not limited thereto. Beam control mechanism 20 is operated according to the material of workpiece 200 and/or the shape of the portion of workpiece 200 to be laser-machined, and thus, the power distribution of laser light LB emitted from laser light emitting head 100 is controlled. Accordingly, workpieces 200 having various materials and shapes can be laser-machined, and processing quality can be improved.

Effects and Others

As described above, laser processing device 1000 according to the present exemplary embodiment includes at least laser oscillator 10 that generates laser light LB, optical fiber 90 that has at least core 90a, first cladding 90b provided coaxially with core 90a on the outer peripheral side of core 90a, and second cladding 90c provided coaxially with core 90a on the outer peripheral side of first cladding 90b and has incident end face 90d and an emission end opposite to incident end face 90d, beam control mechanism 20 that is provided in laser oscillator 10 and introduces the laser light into incident end face 90d of optical fiber 90, and laser light emitting head 100 that is attached to the emission end of optical fiber 90 and illuminates laser light LB to workpiece 200.

Laser oscillator 10 includes first laser oscillation unit 11 that generates first laser light LB1 having first wavelength λ1 and second laser oscillation unit 12 that generates second laser light LB2 having second wavelength λ2 different from first wavelength λ1.

Beam control mechanism 20 includes at least first condenser lens 31 that receives first laser light LB1 and condenses the first laser light at a predetermined magnification, second condenser lens 32 that receives second laser light LB2 and condenses the second laser light at a predetermined magnification, and a dichroic mirror (optical combining member) 33 that receives first laser light LB1 condensed by first condenser lens 31 and second laser light LB2 condensed by second condenser lens 32, forms laser light LB by combining first laser light LB1 and second laser light LB2 such that the optical axis of first laser light LB1 coincides with the optical axis of second laser light LB2, and directs the laser light toward incident end face 90d of optical fiber 90. Here, the term "coincide" includes both a case where the optical axis of first laser light LB1 overlaps the optical axis of second laser light LB2 and a case where the optical axis of first laser light LB1 approaches the optical axis of second laser light LB2 while maintaining a predetermined distance.

Beam control mechanism 20 includes optical path changing and holding mechanism 40 that is disposed on the optical path of second laser light LB2 between second condenser lens 32 and dichroic mirror 33 and changes and holds the optical path of second laser light LB2, and controller 80 that controls an operation of optical path changing and holding mechanism 40. In the present exemplary embodiment, optical path changing and holding mechanism 40 includes optical member 50 having the parallel plate shape, and motor 70 coupled to optical member 50. In the present exemplary embodiment, controller 80 controls the operation of motor 70.

Beam control mechanism 20 controls the power distribution of laser light LB emitted from laser light emitting head 100 by changing the incident position of second laser light LB2 on incident end face 90d of optical fiber 90.

As described above, the optical path of second laser light LB2 can be easily changed by providing optical path changing and holding mechanism 40 on the optical path of second laser light LB2 between second condenser lens 32 and dichroic mirror 33. Accordingly, the power distribution of laser light LB emitted from laser light emitting head 100 can be controlled.

It is preferable that first and second laser light rays LB1 and LB2 are converted into collimated light rays before being incident on first condenser lens 31 and second condenser lens 32.

In this manner, since the optical paths and the optical axes of first and second laser light rays LB1 and LB2 emitted from first condenser lens 31 and second condenser lens 32 are constant, respectively, the optical path of second laser light LB2 can be easily changed by optical path changing and holding mechanism 40. First laser light LB1 and second laser light LB2 are multiplexed such that the optical axes of the first and second laser light rays overlap each other or are close to each other (that is, coincide), and thus, multiplexed laser light LB can be easily incident on optical fiber 90.

Optical member 50 transmits second laser light LB2, and is provided to be tiltable about the X axis (first axis) intersecting with the optical axis of second laser light LB2. Controller 80 drives motor 70 to tilt optical member 50 about the X axis, and thus, beam control mechanism 20 changes the incident position of second laser light LB2 on incident end face 90d of optical fiber 90.

Parallel plate-shaped optical member 50 disposed on the optical path of second laser light LB2 is tilted about the X axis, and thus, the optical path of second laser light LB2 can be reliably and quickly changed. Accordingly, the power distribution of laser light LB emitted from laser light emitting head 100 can be quickly changed. In particular, when the thickness of optical member 50 is about 1 mm to several mm, since the optical member is installed at the narrow position through which condensed second laser light LB2 passes between second condenser lens 32 and dichroic mirror 33, the required size of the optical member is small, and it is easy to quickly tilt the optical member by motor 70. It is easy to rotate the optical member in the reciprocating manner with the predetermined angle range.

Since optical member 50 is disposed in advance on the optical path of second laser light LB2 between second condenser lens 32 and dichroic mirror 33 and is tilted to change the optical path of second laser light LB2, the laser light is not obscured inside the laser device as disclosed in PTL 2. Accordingly, the laser device can be prevented from being damaged, and high processing quality of the laser processing can be maintained.

Controller 80 controls the power of first laser light LB1 and the power of second laser light LB2. Controller 80 may control the power distribution of laser light LB emitted from laser light emitting head 100 by changing the power ratio between the power of first laser light LB1 and the power of second laser light LB2.

In this manner, the power distribution of laser light LB emitted from laser light emitting head 100 can be easily changed in multiple stages.

It is preferable that beam control mechanism 20 causes second laser light LB2 to be incident on first cladding 90b, and it is more preferable that second wavelength λ2 is shorter than first wavelength λ1 and the power distribution of the laser light emitted from laser light emitting head 100 is controlled by changing the power of second laser light LB2 with respect to the power of first laser light LB1.

In this manner, second laser light LB2 having a short wavelength can be used as a main component of an outer portion in the beam profile of laser light LB, and the outer portion of laser light LB can be effectively used in the laser processing of the metal.

Beam control mechanism 20 controls the power distribution of laser light LB emitted from laser light emitting head 100 according to at least one of the material of workpiece 200 and the shape of the portion of workpiece 200 to be laser-machined.

In this manner, workpieces 200 having various materials and shapes can be laser-machined, and the processing quality can be improved. When laser processing device 1000 according to the present exemplary embodiment is used for the laser welding, a weld bead having a good outer appearance can be formed.

It is preferable that beam control mechanism 20 is configured to switch between the power distributions of laser light LB emitted from laser light emitting head 100 during the laser-processing of workpiece 200.

A laser processing method according to the present exemplary embodiment includes at least a first illumination step of illuminating laser light LB having a first power distribution to workpiece 200 and a second illumination step of subsequently illuminating laser light LB having a second power distribution different from the first power distribution to workpiece 200.

Molten pool 210 and keyholes 220 are formed on the surface of workpiece 200 in the first illumination step, and opening 221 of keyholes 220 is expanded and molten pool 210 is grown to have the desired weld-penetration depth in the second illumination step.

In this manner, for example, the power density of laser light LB illuminated to workpiece 200 is increased, and molten pool 210 and keyhole 220 can reliably be formed at the start of welding. After molten pool 210 and keyholes 220 are formed, opening 221 of keyholes 220 is expanded by reducing the power density of laser light LB illuminated to workpiece 200. Thus, it is possible to prevent the air bubble inside molten pool 210 from being generated, unevenness 211 and the spatter from being caused on the surface of molten pool 210, and the shape of keyholes 220 from being disturbed, and it is possible to improve the welding quality. A weld bead having a good outer appearance can be formed.

Second Exemplary Embodiment

Figure 10:
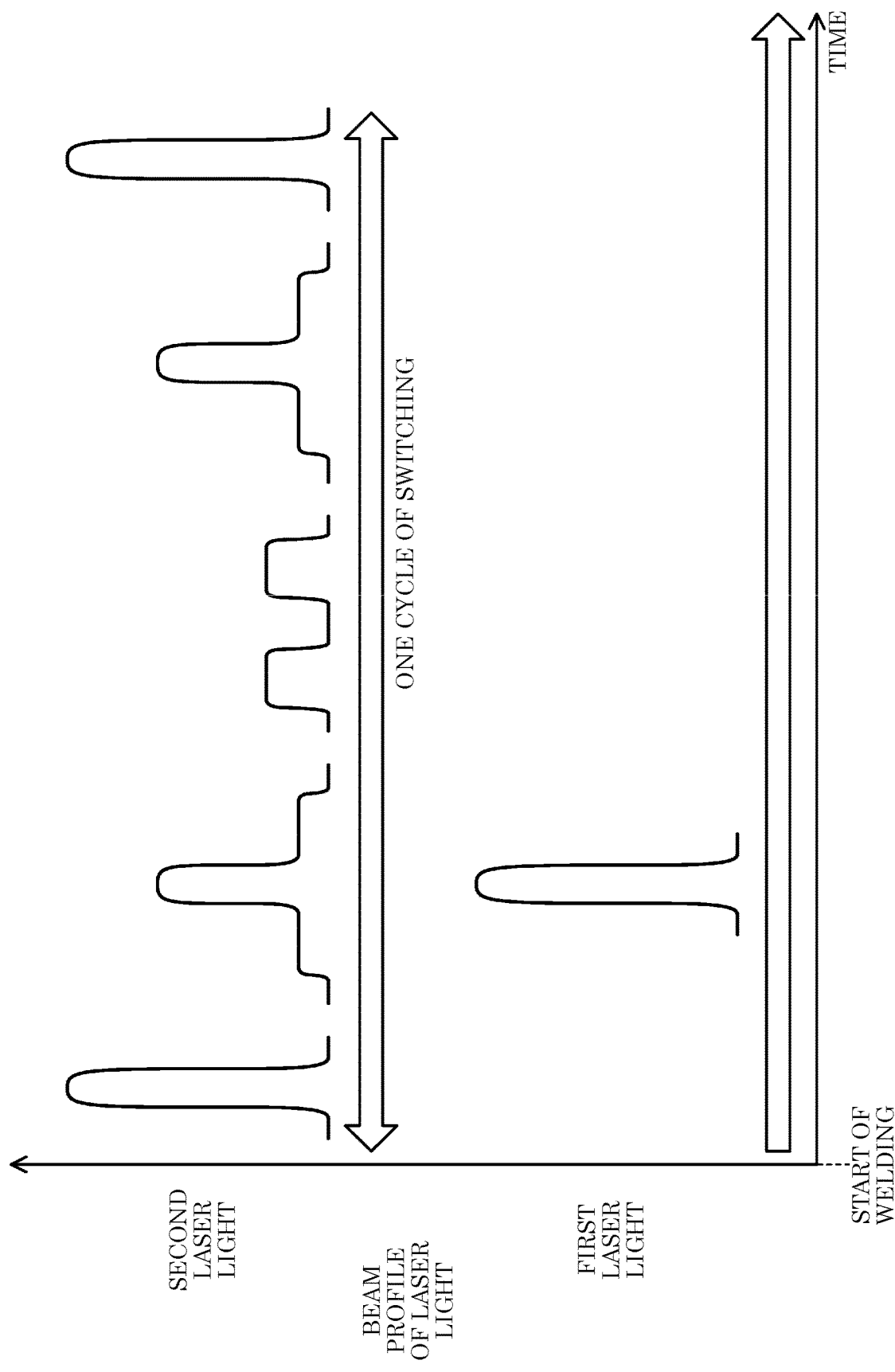
FIG. 10 is a welding sequence of a workpiece according to a second exemplary embodiment.

FIG. 10 is a welding sequence of a workpiece according to the present exemplary embodiment. In FIG. 10, the same portions as the portions in the first exemplary embodiment are denoted by the same reference marks, and the detailed description will be omitted.

Motor 70 is rotated in the reciprocating manner within a predetermined angle range (direction B illustrated in FIG. 3), and thus, optical member 50 also rotates in a reciprocating manner within a predetermined angle range accordingly. A rotation frequency is set to about several Hz to several kHz. That is, beam control mechanism 20 is configured to switch between the power distributions of laser light LB emitted from laser light emitting head 100 during laser-processing of workpiece 200.

In this case, as illustrated in FIG. 10, the power distribution of laser light LB emitted from an emission end of laser light emitting head 100 changes periodically. Specifically, second laser light LB2 continuously changes from a beam profile having a unimodal peak (case 1 illustrated in FIG. 7) to a beam profile including a unimodal portion and terrace portions having a wide half-width formed on both sides of the unimodal portion (case 2 illustrated in FIG. 7) and a beam profile in which the power of the central portion becomes zero (case 5 illustrated in FIG. 7), and the change is periodically repeated. The rotation frequency of optical member 50 corresponds to a frequency at which the power distribution of laser light LB changes.

In this manner, for example, a portion of keyhole 220 near opening 221 is prevented from being excessively narrowed by causing the outer portion of laser light LB having second laser light LB2 as the main component to be absorbed to molten pool 210 while molten pool 210 and keyhole 220 are reliably formed in workpiece 200, and the laser welding in which the generation of the air bubble and the spatter is suppressed can be performed.

The power distributions of laser light LB are periodically switched at a predetermined frequency, in this case, at a frequency substantially equal to a natural vibration frequency of keyhole 220 formed in workpiece 200, and thus, it is possible to effectively prevent unevenness 211 to be formed at the rear of molten pool 210 described above or the shape of keyhole 220 from being disturbed. A further description will be given below.

While molten pool 210 is sequentially formed along the traveling direction of the laser welding, keyhole 220 also moves along the traveling direction of the laser welding. At this time, keyhole 220 vibrates by repeating expansion and contraction in a diametrical direction and/or a depth direction at a natural vibration frequency (hereinafter, simply referred to as a natural vibration frequency). The natural vibration frequency is a value determined by a size of molten pool 210, a viscosity at the time of melting constituent metal of molten workpiece 200, and the like, and is estimated to be about several Hz to several kHz in many cases.

The power distribution of laser light LB illuminated to workpiece 200 is periodically changed at a frequency substantially equal to the natural vibration frequency, and thus, the shape of keyholes 220 is stabilized. It is possible to prevent the constricted portion from being generated inside and the air bubble from being generated inside workpiece 200. Unevenness 211 formed at the rear of molten pool 210 can be reduced.

In actual laser welding, it is difficult to measure or obtain a natural vibration number of molten pool 210, but a frequency at which the power distributions of laser light LB are switched may be obtained by a laser welding experiment. That is, the laser welding experiment may be performed at several kinds of switching frequencies in advance, and a frequency at which a number of air bubbles is the smallest and a bead outer appearance is good may be determined among the switching frequencies.

Modification Example

When a shape of a portion of workpiece 200 to be laser-welded changes along the traveling direction of the laser welding, good laser welding can be performed by appropriately switching between the power distributions of laser light LB illuminated to workpiece 200 according to the shape of the portion to be welded. An exemplary case will be further described with reference to FIG. 11.

Figure 11:
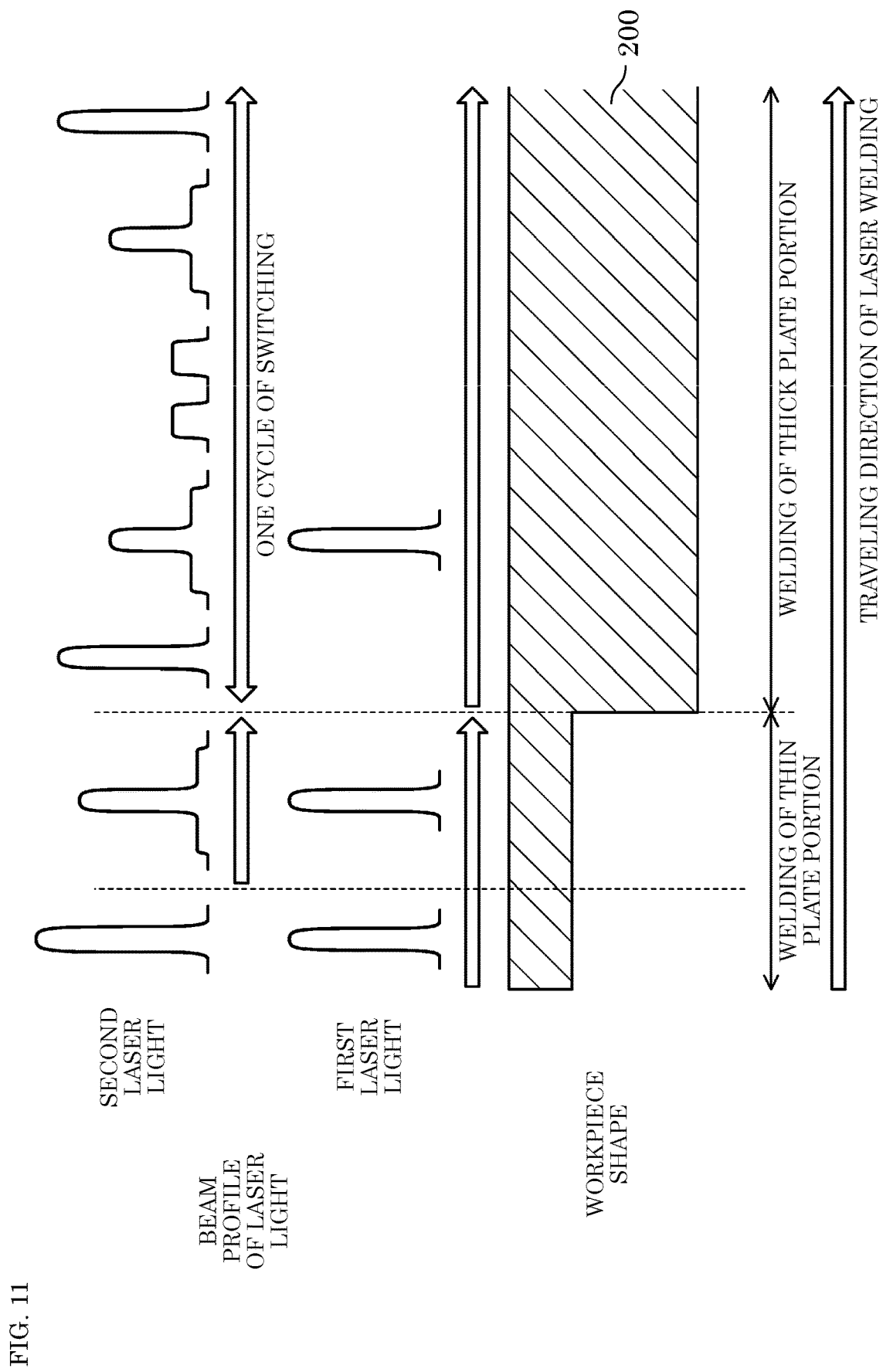
FIG. 11 is a welding sequence of a workpiece according to a modification example.

FIG. 11 illustrates a welding sequence of a workpiece according to the present modification example, and workpiece 200 has a shape having a thin plate portion and a thick plate portion continuous with the thin plate portion. A thickness of the thick plate portion is more than a thickness of the thin plate portion.

First, when the thin plate portion is laser-welded, workpiece 200 is illuminated by laser light LB in the sequence illustrated in FIG. 9. In the thin plate portion having a thickness equal to or less than a predetermined thickness, the weld-penetration depth may not be deep. Thus, welding may be performed with a beam profile having a constant shape. Thus, after workpiece 200 is illuminated by first laser light LB1 and second laser light LB2 having the beam profile having the unimodal peak at the start of welding, and after molten pool 210 and keyhole 220 are formed, the constricted portion is prevented from being formed in keyhole 220 by causing second laser light LB2 to be incident on first cladding 90b such that the power distribution of laser light LB becomes broad. At this time, the power ratio between first laser light LB1 and second laser light LB2 may be fixed. At the start of welding, workpiece 200 may be illuminated by only second laser light LB2.

Subsequently, when the welding of the thin plate portion is ended and the welding of the thick plate portion is started, workpiece 200 is illuminated by the laser light in the sequence illustrated in FIG. 10. In this case, it is necessary to increase the weld-penetration depth in order to secure bonding strength of the thick plate portion. As the weld-penetration depth becomes deeper, air bubbles are more likely to be formed, and thus, it is necessary to prevent the air bubbles from being formed. That is, workpiece 200 is illuminated by laser light LB while the power distribution of second laser light LB2 is periodically changed at the natural vibration frequency of molten pool 210 by using the sequence illustrated in FIG. 10.

In this manner, the air bubbles inside workpiece 200 and unevenness 211 and the spatter on the surface of molten pool 220 can be prevented as described above while the weld-penetration depth is increased, and the welding quality can be improved.

Depending on the material of workpiece 200 and the thickness of the thin plate portion, the thin plate portion may be welded in a state where laser light LB is fixed such that the power distribution becomes broad.

Other Exemplary Embodiments

In the first and second exemplary embodiments including the modification example, although the multi-clad fiber having the structure illustrated in FIG. 2 has been described as an example, other structures may be used. For example, one or a plurality of claddings may be provided on the outer peripheral side of second cladding 90c. In this case, the refractive indexes of the adjacent claddings may be sequentially decreased from second cladding 90c toward the outer peripheral side. Thus, second laser light LB2 can be incident on all claddings except the cladding closest to the outer peripheral side.

In the configuration illustrated in FIG. 3, although second laser light LB2 is reflected by dichroic mirror 33, first laser light LB1 may be reflected by dichroic mirror 33. That is, in the configuration illustrated in FIG. 3, an incident direction of first laser light LB1 and an incident direction of second laser light LB2 are exchanged, and the arrangement of first condenser lens 31 and second condenser lens 32 is exchanged. Dichroic mirror 33 is configured to transmit second laser light LB2 as it is and reflect first laser light LB1. In this case, since the optical path of first laser light LB1 can be changed by optical path changing and holding mechanism 40, that is, optical member 50 and motor 70 before the first laser light is transmitted through dichroic mirror 33, the same effects as the effects illustrated in the first and second exemplary embodiments are also obtained.

In the configuration illustrated in FIG. 3 and the above configuration, another optical path changing and holding mechanism (not illustrated) may be provided on the optical path between first condenser lens 31 and dichroic mirror 33. In this case, optical path changing and holding mechanism 40 may be disposed on the optical path between second condenser lens 32 and dichroic mirror 33.

In this manner, the power distribution of laser light LB emitted from laser light emitting head 100 can be changed more finely and easily in multiple stages, and thus, the present invention is useful for laser processing of workpieces 200 having various materials or shapes. When another optical path changing and holding mechanism is provided on the optical path between first condenser lens 31 and dichroic mirror 33, optical path changing and holding mechanism 40 on the optical path between of second condenser lens 32 and dichroic mirror 33 may be omitted.

Outputs and wavelengths of first laser light LB1 and second laser light LB2 can be appropriately changed depending on a material and a shape of workpiece 200 or processing contents.

In the first and second exemplary embodiments, optical member 50 is tilted about the X axis, but may be tilted about an axis extending in the Y direction. In this case, positions of motor 70 and holder 60 are changed such that output shaft 70a of motor 70 extends in the Y direction. The incident direction of second laser light LB2 is changed to the Z direction. In order to tilt optical member 50, an actuator other than motor 70, for example, a piezoelectric actuator or the like may be used.

In the present specification, although so-called keyhole type laser welding in which keyhole 220 is formed in molten pool 210 has been described as an example, it goes without saying that laser processing device 1000 described above can be applied to so-called thermal conduction type laser welding in which keyhole 220 is not formed. The type of the laser welding can be appropriately selected depending on the material and shape of workpiece 200, the required weld-penetration depth, the width of the weld bead, and the like. It goes without saying that laser processing device 1000 and the welding sequence described above can be applied not only to the laser welding but also to laser cutting, laser drilling, or the like.

INDUSTRIAL APPLICABILITY

The laser processing device according to the present invention is useful for laser-processing workpieces having various materials or shapes since it is possible to control the power distribution of the laser light obtained by combining the laser light rays having different wavelengths from each other with a simple configuration.

REFERENCE MARKS IN THE DRAWINGS

10: laser oscillator
11: first laser oscillation unit
12: second laser oscillation unit
20: beam control mechanism
31: first condenser lens
32: second condenser lens
33: dichroic mirror (optical combining member)
40: optical path changing and holding mechanism
50: optical member
60: holder
70: motor
70a: output shaft
80: controller
90: optical fiber
90a: core
90b: first cladding
90c: second cladding
90d: incident end face
100: laser light emitting head
110: manipulator
200: workpiece
210: molten pool
220: keyhole
221: opening
1000: laser processing device
LB: laser light
LB1: first laser light
LB2: second laser light

The invention claimed is:
1. A laser processing device, comprising at least:
a laser oscillator that generates laser light;
an optical fiber that includes at least a core, a first cladding provided coaxially with the core on an outer peripheral side of the core, and a second cladding provided coaxially with the core on an outer peripheral side of the first cladding, and includes an incident end face and an emission end opposite to the incident end face;
a beam control mechanism that is provided in the laser oscillator, introduces the laser light into the incident end face of the optical fiber, and controls a power distribution of the laser light emitted from the emission end of the optical fiber; and
a laser light emitting head that is attached to the emission end of the optical fiber, and illuminates the laser light to a workpiece, wherein
the laser oscillator includes a first laser oscillation unit that generates first laser light having a first wavelength, and a second laser oscillation unit that generates second laser light having a second wavelength different from the first wavelength,
the beam control mechanism includes at least
a first condenser lens that receives the first laser light, and condenses the first laser light at a predetermined magnification,
a second condenser lens that receives the second laser light, and condenses the second laser light at a predetermined magnification,
an optical combining member that receives the first laser light condensed by the first condenser lens and the second laser light condensed by the second condenser lens, forms the laser light by combining the first laser light and the second laser light, an optical axis of the first laser light coinciding with an optical axis of the second laser light, and causes the laser light to be directed to the incident end face of the optical fiber,
an optical path changing and holding mechanism that is disposed on at least one of an optical path of the first laser light between the first condenser lens and the optical combining member and an optical path of the second laser light between the second condenser lens and the optical combining member, and changes and holds at least one of the optical path of the first laser light and the optical path of the second laser light, and
a controller that controls an operation of the optical path changing and holding mechanism, and
the beam control mechanism controls a power distribution of the laser light emitted from the laser light emitting head by changing an incident position of at least one of the first laser light and the second laser light on the incident end face of the optical fiber.

2. The laser processing device according to claim 1, wherein
the optical path changing and holding mechanism includes
a parallel plate-shaped optical member that transmits at least one of the first laser light and the second laser light, and is provided to be tiltable about an axis intersecting with at least one of the optical axis of the first laser light and the optical axis of the second laser light, and
an actuator that is coupled to the parallel plate-shaped optical member, and
the controller drives the actuator to tilt the parallel plate-shaped optical member, and the beam control mechanism changes the incident position of the at least one of the first laser light and the second laser light on the incident end face of the optical fiber.

3. The laser processing device according to claim 1, wherein the controller controls a power of the first laser light and a power of the second laser light, and the controller controls the power distribution of the laser light emitted from the laser light emitting head by changing a power ratio between the power of the first laser light and the power of the second laser light.

4. The laser processing device according to claim 1, wherein the beam control mechanism causes the first laser light or the second laser light to be incident on at least one of the core and the first cladding.

5. The laser processing device according to claim 3, wherein
the second wavelength is shorter than the first wavelength,
the second laser light is incident on the first cladding, and
the controller controls the power distribution of the laser light emitted from the laser light emitting head by changing the power of the second laser light with respect to the power of the first laser light.

6. The laser processing device according to claim 1, wherein the beam control mechanism controls the power distribution of the laser light emitted from the laser light emitting head according to at least one of a material of the workpiece and a shape of a portion of the workpiece to be laser-machined.

7. The laser processing device according to claim 6, wherein the beam control mechanism is configured to switch between power distributions of the laser light emitted from the laser light emitting head during the laser-processing of the workpiece.

8. The laser processing device according to claim 7, wherein the beam control mechanism is configured to periodically switch between the power distributions of the laser light emitted from the laser light emitting head during the laser-processing of the workpiece.

9. The laser processing device according to claim 1, wherein
the first laser oscillation unit is a disk laser, a fiber laser, or a yttrium aluminum garnet (YAG) laser, and the first wavelength is in a range from 1000 nm to 1100 nm, and
the second laser oscillation unit is a semiconductor laser, and the second wavelength is in a range from 800 nm to 1000 nm.

10. The laser processing device according to claim 1, wherein the first laser oscillation unit is a disk laser, a fiber laser, or a YAG laser, and the first wavelength is in a range from 1000 nm to 1100 nm, and
the second laser oscillation unit is a visible-light laser, and the second wavelength is in a range from 400 nm to 800 nm.

11. The laser processing device according to claim 1, wherein
the first laser oscillation unit is a semiconductor laser, and the first wavelength is in a range from 800 nm to 1000 nm, and
the second laser oscillation unit is a visible-light laser, and the second wavelength is in a range from 400 nm to 800 nm.

12. A laser processing method using the laser processing device according to claim 1, the method comprising at least:
a first illumination step of illuminating the laser light having a first power distribution to the workpiece; and
a second illumination step of subsequently illuminating the laser light having a second power distribution different from the first power distribution to the workpiece.

13. The laser processing method according to claim 12, wherein
in the first illumination step, a molten pool and a keyhole are formed on a surface of the workpiece, and
in the second illumination step, an opening of the keyhole is expanded, and the molten pool is grown so as to have a desired weld-penetration depth.

14. The laser processing method according to claim 12, wherein
in the first illumination step, a first portion of the workpiece having a first thickness is illuminated by the laser light, and
in the second illumination step, a second portion of the workpiece having a second thickness different from the first thickness is illuminated by the laser light.

15. The laser processing method according to claim 13, wherein in the second illumination step, the first power distribution and the second power distribution of the laser light are periodically switched at a predetermined frequency.

16. The laser processing method according to claim 15, wherein the predetermined frequency is substantially equal to a natural vibration frequency of the keyhole formed in the workpiece.

* * * * *